United States Patent [19]

Winchell et al.

[11] 4,088,338
[45] May 9, 1978

[54] CAMBERING VEHICLE WITH CABLE STABILIZER AND EQUALIZER

[75] Inventors: Frank J. Winchell, Orchard Lake; Klaus O. Winkelmann, Troy; Jerry R. Mrlik, Birmingham; Richard E. Denzer, Bloomfield Hills; Jerry K. Williams, Sterling Heights, all of Mich.

[73] Assignee: General Motors Corporation, Detroit, Mich.

[21] Appl. No.: 767,053

[22] Filed: Feb. 9, 1977

[51] Int. Cl.$^2$ .............................................. B62M 1/04
[52] U.S. Cl. ...................................... 280/220; 280/253
[58] Field of Search ............... 280/220, 221, 252, 253, 280/200, 16, 21, 251

[56] References Cited

U.S. PATENT DOCUMENTS

| | | | |
|---|---|---|---|
| 1,617,357 | 2/1927 | Walter | 280/221 |
| 2,105,085 | 1/1938 | Laborda | 280/251 |
| 2,593,974 | 4/1952 | Brown | 280/21 R |
| 3,799,565 | 3/1974 | Burtis | 280/16 |
| 4,026,571 | 5/1977 | Vereyken | 280/251 |

FOREIGN PATENT DOCUMENTS 49-42,586  11/1974  Japan ................................ 280/87 R Primary Examiner—Kenneth H. Betts
Attorney, Agent, or Firm—Charles R. White

[57] ABSTRACT

An articulated frame type cambering vehicle employing a cable stabilizer and equalizer which interconnects the trailing arms for controlled pivotal movement and includes means for locking the trailing arms together for vehicle parking in an upright position and for allowing the vehicle to be folded and maintained in a compact configuration so as to facilitate stowage thereof.

5 Claims, 6 Drawing Figures

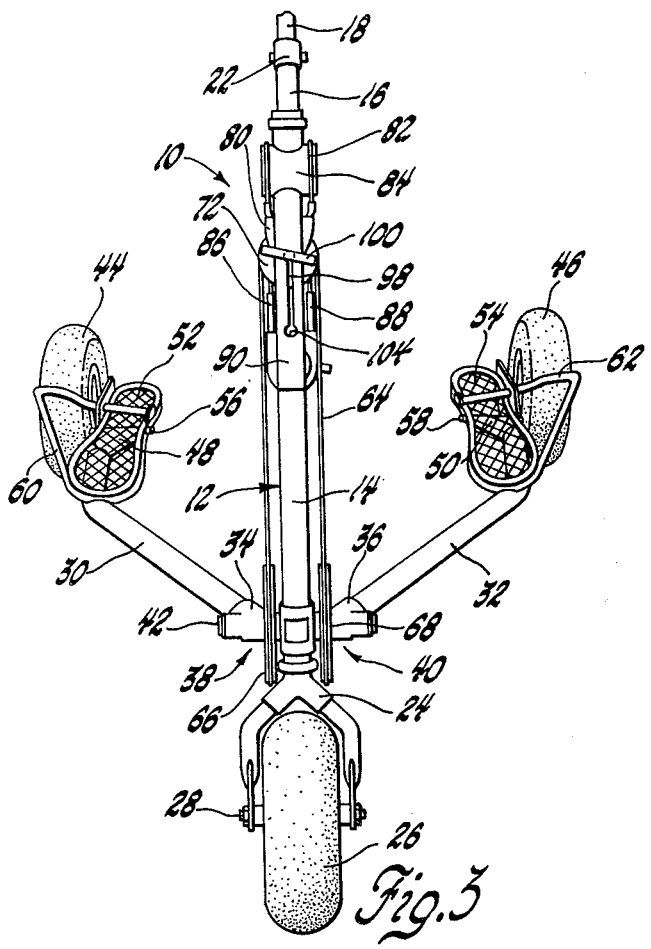
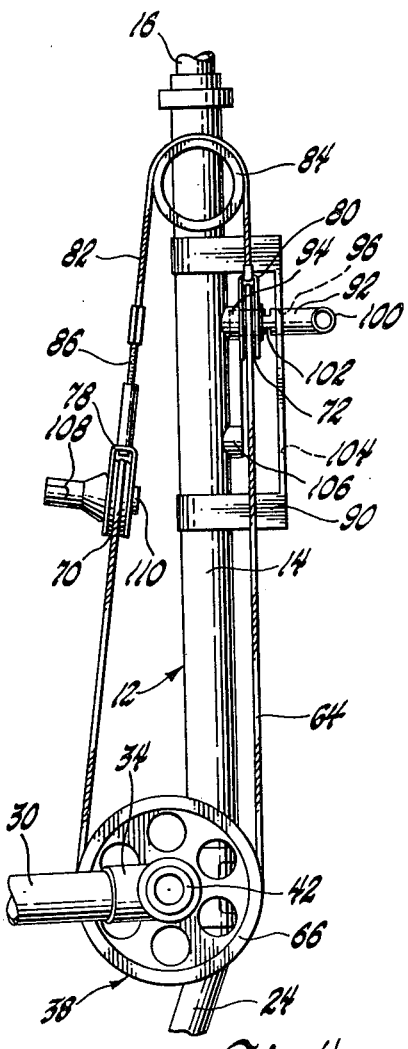

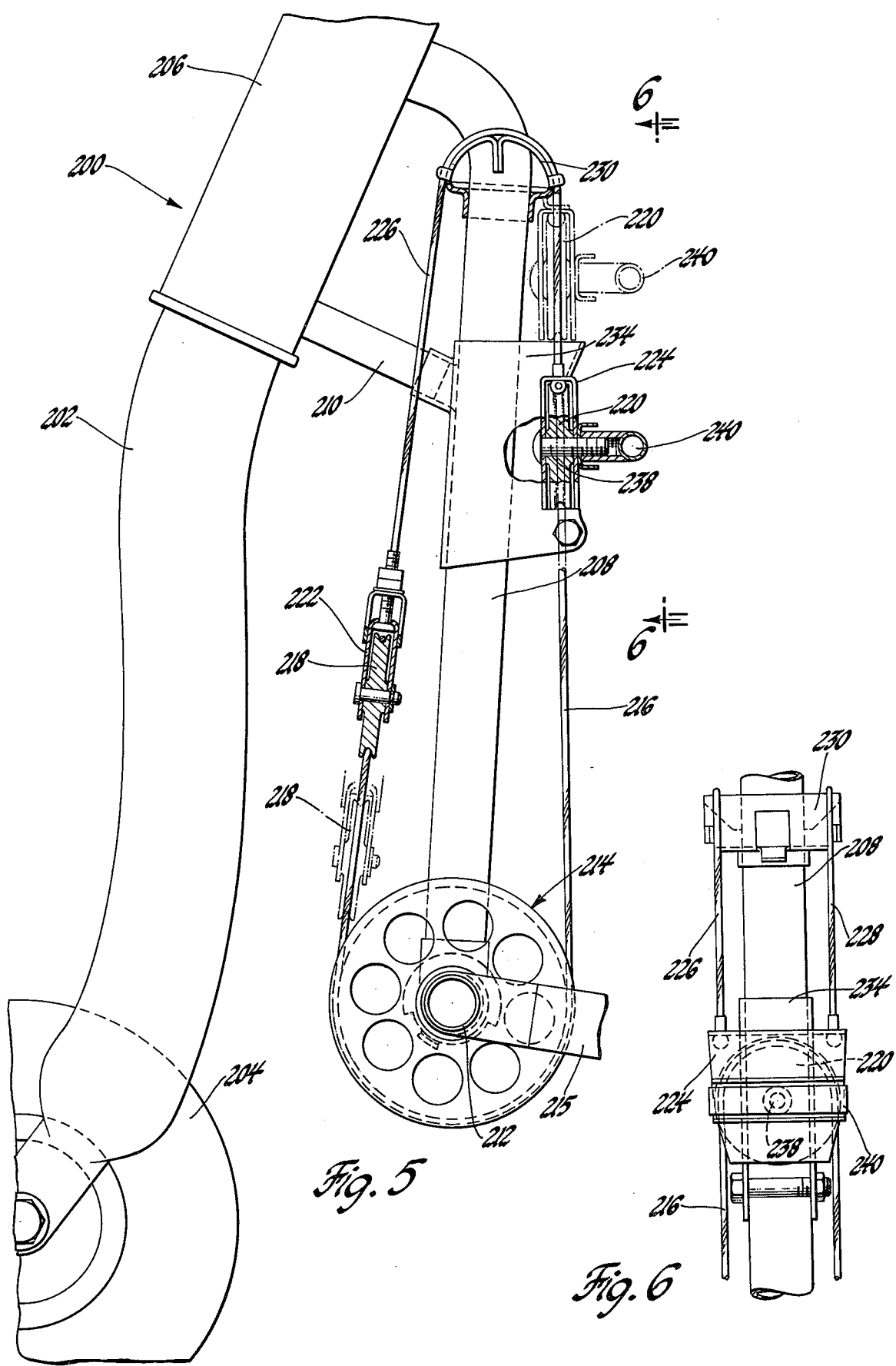

CAMBERING VEHICLE WITH CABLE STABILIZER AND EQUALIZER

This invention concerns cambering vehicles and more particularly an articulated frame type cambering vehicle having a cable stabilizer and equalizer which interconnects the trailing arms and steering column thereof for vehicle cambering operations, which further permits the vehicle to be collapsed into a compact configuration and to be subsequently locked for stowage purposes and which allows the vehicle to be parked upright on a level or inclined surface.

United States Patent Application Ser. No. 649,967 filed on Jan. 19, 1976 and entitled "Cambering Vehicle" discloses a frame type cambering vehicle which has a steerable front ground contact means and laterally spaced rear ground contact means. The rear ground contact means are mounted on trailing arms the terminal portions of which are swingable in opposite up and down directions to permit the vehicle to be cambered when the operator tilts the vehicle during cornering maneuvers. This arrangement provides a three-point contact vehicle with the contact means taking the form of wheels, skis, or ice skates. The wheeled vehicle can be powered by an internal combustion engine or an electric motor or if desired, can be manually powered through the natural input from the vehicle operator by the timed shifting of weight from one foot to the other onto the rear ends of the trailing arms. A vehicle of this type can be used as a recreational vehicle when equipped with skis or ice skates or as a short distance general utility or people mover vehicle when equipped with wheels.

The present invention concerns cambering vehicles of the above described type and is directed more specifically to a cambering vehicle employing a cambering device which allows the trailing arms to be locked relative to each other and folded towards the steering frame so as to provide a compact package which can be stored in a minimum of space such as the trunk of a passenger vehicle. According to the invention, a latch and lock mechanism is incorporated with the cambering device which serves to interconnect the trailing arms and controls the equal and opposite movement thereof when the vehicle is leaned into a turn. In the preferred form of this invention, the cambering device consists of a cable and pulley arrangement which interconnects the trailing arms of the vehicle with one pulley being mounted in a clevis that is connected through a cable and appropriate tensioning means to a second pulley which is also mounted in a clevis. One pulley incorporates a screw-operated locking device having a handle which upon rotation in one direction locks the pulley in a fixed position and by doing so, causes the trailing arms to be maintained in fixed relative positions so that the vehicle can be parked on a level or an inclined surface. The clevis of the other pulley is fixed with a pin which is slidable within an elongated slot formed in a bracket secured to the steering frame of the vehicle. By moving the pin vertically relative to the steering frame between two positions, the trailing arms can be positioned for normal operation of the vehicle or locked in a collapsed position with the steering frame and arms located adjacent each other and extending in generally the same direction. In this manner, a cambering device is provided which selectively permits the vehicle to be parked, or if desired, folded into a compact configuration for stowage purposes.

The objects of the present invention are to provide a new and improved cambering vehicle having pivoted trailing arms which through an interconnecting cable stabilizer and equalizer system that allows the trailing arms to be selectively locked together and folded towards the steering frame so as to provide a compact package for stowage purposes; to provide a new and improved cambering vehicle in which the cable stabilizer and equalizer system interconnects the trailing arms and incorporates locking means for permitting the vehicle to be parked on a level or inclined surface; and to provide a new and improved cambering vehicle having a mechanical cable and pulley system interconnecting the trailing arms that includes a locking arrangement for maintaining the trailing arms in fixed relative positions and for allowing the trailing arms to be folded towards the steering frame and to be locked in a collapsed position wherein the steering frame and trailing arms are positioned adjacent each other and extend in generally the same direction so as to provide a compact vehicle configuration that can be stowed in a minimum of space.

Other objects and advantages of the present invention will be apparent from the following detailed description when taken with the drawings in which:

FIG. 3 is a frontal perspective view of the cambering vehicle shown in FIG. 1.

FIG. 4 is an enlarged side elevational view of the cambering device incorporated with the vehicle shown in FIGS. 1 - 3.

FIG. 5 is an enlarged side elevational view of a portion of a cambering vehicle illustrating a modification of the invention; and FIG. 6 is a view taken generally along lines 6 — 6 of FIG. 5.

Figure 1:
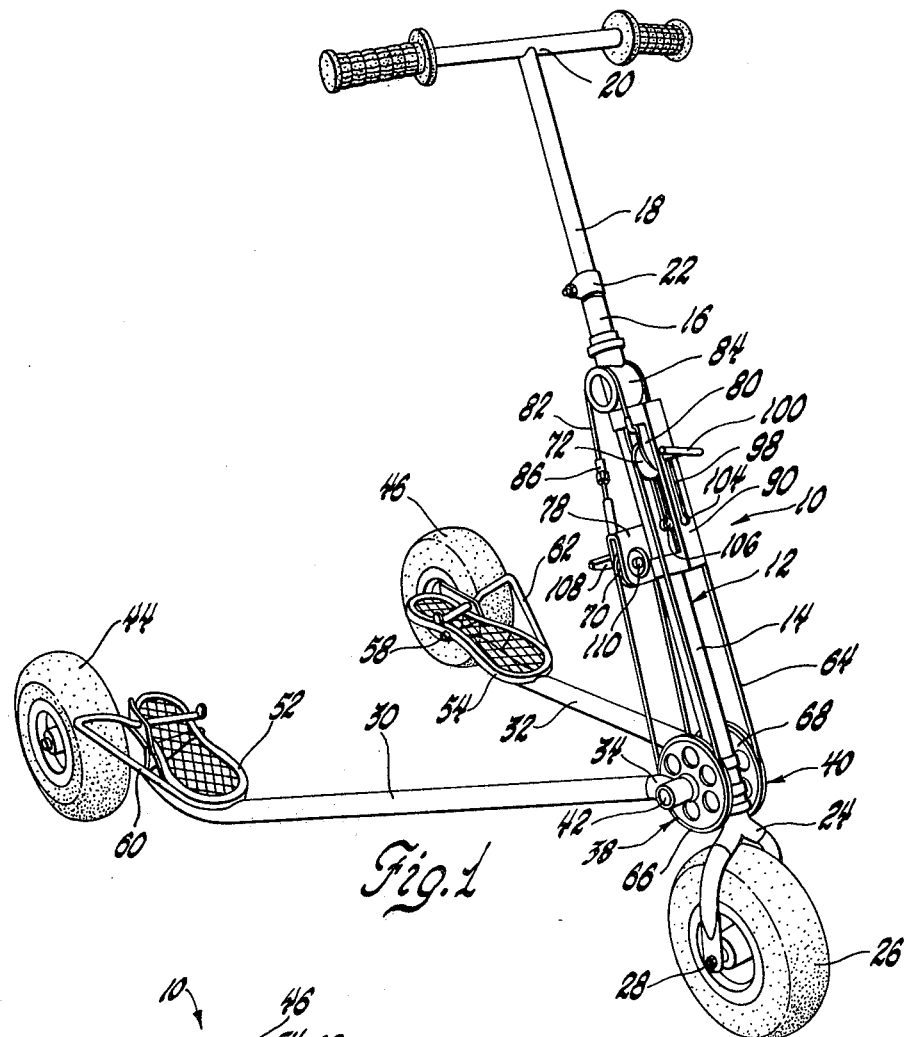
FIG. 1 is a perspective view showing a cambering vehicle incorporating a latch and lock mechanism that allows the trailing arms of the vehicle to be locked together and folded towards the steering frame in accordance with the invention.

Referring to the drawings and more particularly FIGS. 1 - 4, a cambering vehicle is shown which is adapted to be propelled in a forward direction by a natural input from the vehicle operator through the timed shifting of his weight from one foot to the other coordinated with the left and right cambered steering of the vehicle in a sinuous path. The vehicle is identified by reference numeral 10 and has a frame portion 12 comprising an inclined and elongated cylindrical main frame 14 that axially locates and rotatably supports a tubular steering shaft 16 extending therethrough. The upper end of steering shaft 16 telescopically mounts the centralized connector shaft 18 of handle bar assembly 20. A clamp 22 carried by the upper end of shaft 16 can be constricted by conventional threaded fastener means to hold the handle bar assembly in adjusted position. The steering shaft 16 has a lower bifurcated end 24 which provides a fork for steerable front wheel 26. The wheel 26 rotates on an axle 28 which extends transversely through and is supported by the fork. The vehicle has a pair of tubular trailing arms 30 and 32 which respectively have their forward ends secured in sockets 34 and 36 of right and left side pulley assemblies 38 and 40. The pulley assemblies 38 and 40 are mounted for turning movement on a horizontally extending pivot shaft 42 which is supported by the main frame 14. With this construction each trailing arm is mounted for up and down swinging movement on the axis provided by the pivot shaft 42 and on opposite sides of main frame 14.

Right and left rear wheels 44 and 46 are rotatably mounted on axles which extend laterally and outwardly from the free end of trailing arms 30 and 32, respectively. In addition to supporting the rear wheels 44 and 46, the end of trailing arms 30 and 32 have mounting brackets 48 and 50 secured respectively thereto for right and left foot pads 52 and 54 adapted to support the feet of the vehicle operator. As best shown in FIGS. 1 and 3, the foot pads 52 and 54 are located laterally inboard of the rear wheels 44 and 46 and are tiltably mounted on pivot pins 56 and 58 carried by brackets 48 and 50, respectively. Foot pad 52 disposed inboard of wheels 44 has an outwardly extending tubular friction brake member 60 secured thereto that directly engages the outer periphery of the wheel 44 when the pad is rocked rearwardly on pivot pin 56 by the operator to effect braking of wheel 44. In a forward tilt position of pad 52, the brake member 60 is spaced from wheel 44 so that the wheel can freely rotate. In a like manner, foot pad 54 has an outwardly extending tubular brake member 62 secured thereto which is adapted to directly engage and brake the left rear wheel 46 when pad 54 is rocked rearwardly on pivot pin 58 by the vehicle operator. In the forward tilt position of this pad, the brake member 62 is spaced from the wheel 46 so that it may roll freely.

The trailing arms 30 and 32 are interconnected in a way so that the swinging of one arm on pivot shaft 42 in one direction will tend to swing the other arm automatically in the opposite direction. To this end the arms 30 and 32 are mechanically interconnected by a cambering device that includes endless cable 64 which extends around right and left side trailing arm pulleys 66 and 68 and a pair of transverse upper pulleys 70 and 72. Cable 64 leads from right side pulley 66 around pulley 70 and from pulley 70 around left side pulley 68. From pulley 68 the cable 64 leads around upper pulley 72 and back to the right side pulley 66. Cable 64 is connected to pulleys 66, 68 and 70 by any suitable means to prevent slippage. The pulley 66 forms part of a pulley assembly and is rotatable by trailing arm 30, likewise, pulley 68 is part of a pulley assembly and is turned by rotation of trailing arm 32. Pulleys 70 and 72 are rotatably supported on clevises 78 and 80 which are adjustably interconnected by a cable 82. As shown, the cable 82 loops through the upper end of clevis 80 and straddling the tubular main frame 14 extends around the right and left sides of a transversely extending tubular shoulder 84 secured to the main frame 14. The terminal ends of cable 82 are connected by threaded cable tensioners 86 and 88 to the clevis 78.

In the operating position of FIG. 1, the endless cable 64, with clevises 78 and 80 fixed in position, stabilizes the steering shaft at a fixed rake angle with respect to the vehicle support surface. While the steering shaft is thus angularly fixed the trailing arms can be turned upwardly and downwardly in equal and opposite directions on pivot shaft 42. For example during cambering operation one trailing arm may be turned on pivot shaft 42 in one direction to actuate the associated pulley and cable 64. With cable 64 being moved the opposite pulley and trailing arm is turned on pivot shaft 42 in an equal and opposite direction.

Clevis 80 and its pulley 72 are adjustably mounted with respect to a bracket 90 secured to and extending along an upper portion of elongated tubular main frame 14. As shown, the pulley 72 and its associated clevis 80 are supported by a pivot pin 92 which extends through and rotatably supports pulley 72. The inner end of the pin 92 is removably seated in a cylindrical bearing 94 integral with tubular main frame 14 and extends outwardly from this bearing through the circular upper eye 96 of a keyhole slot 98. Pin 92 terminates in a handle 100 and has a necked or slotted intermediate portion 102 which fits within the narrow track of the keyhole slot 98. With this construction the operator can grasp handle 100 and pull the end of pin 92 out of bearing 94. The handle 100 can be subsequently turned to align the slotted portion 102 of the pin with the narrow track of the keyhole slot 98 so that the clevis 80 and pulley 72 can be lowered as the main frame 14 is being tilted from the vehicle operating position of FIG. 1 to the stowed position shown in FIG. 2. When the lower eye 104 of the keyhole slot 98 is reached, the pin 92 can be pushed inwardly into engagement with a lower bearing 106 integral with main frame 14. In this position, the slotted portion 102 of the pin 92 is misaligned with respect to the narrow track of the keyhole slot 98 so that the vehicle is latched in the stowed position. In a similar manner described in connection with the folding of the vehicle the pin 92 can be disengaged with the lower bearing 106 and the pin and clevis moved upwardly as the main frame is turned from the stowed position of FIG. 2 to the operating position of FIG. 1.

Pulley 70 can be prevented from turning to thereby hold the vehicle in an upright position by the manual turning of locking handle 108. By turning this handle, threaded means 110 is drawn toward the handle so that the sides of clevis 78 frictionally engage the sides of pulley 70 to lock the trailing arms 30 and 32 together for vehicle parking or for stowage purposes.

The operation of the vehicle 10 described above is fully explained in the aforementioned patent application Ser. No. 649,967, however, for present purposes it will suffice to mention that the vehicle is propelled by the operator first grasping the handle bar assembly 20 and placing one foot on one foot pad using his other foot to push off the support surface to give the vehicle an initial velocity. After pushing off, the operator places his feet on their respective foot pads 52 and 54 so that operator input can be imparted into the vehicle for forward propulsion. Initially the operator distributes his weight to his right foot and camber steers the vehicle in an arcuate path towards the left. With the vehicle turning on the arcuate path, the right rear wheel 44 has a turning radius which is greater than the turning radius of the inside or left rear wheel 46. While holding the circular path of the vehicle substantially constant during this turning action and as he leans the vehicle into the turn the operator shifts his weight from his right to his left foot and thus to the left wheel 46. Since the angular momentum has not changed, the shift of the operator's mass to a smaller radius will naturally result in an increase in vehicle velocity. The operator subsequently cambers and steers the vehicle in an opposite direction so that it describes an arcuate path about another center point. Since at the beginning of the second half of the operating cycle the mass of the operator is over the left rear wheel 46, velocity can be again increased by the operator shifting his weight from his left to his right foot. Thus the operator's mass is moved from a larger radius to a smaller radius to again increase net velocity. By repeating this action a net forward travel of the vehicle is achieved. The cambering of the vehicle during the work cycle facilitates operation. With cambering, the track of the vehicle is widened so that the amount of work per cycle is increased. The self propulsion is most effective on flat smooth surfaces where speeds approaching 20 m.p.h. may be obtained.

While the manually propelled cambering vehicle 10 has been illustrated and described with wheels providing the threepoint contact, it should be understood that ice runners or skates may be readily substituted for the wheels. Such modifications are shown in the aforementioned patent application Ser. No. 649,967.

Figure 2:
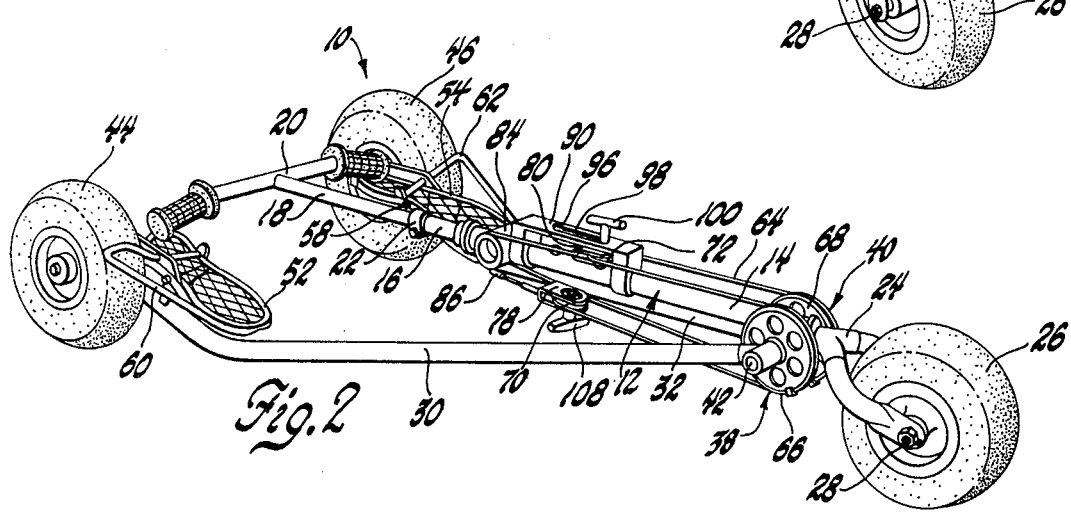
FIG. 2 shows the cambering vehicle of FIG. 1 with the steering frame folded into juxtaposition with the trailing arms and locked in this position for stowage and handling purposes.

FIG. 5 illustrates another three place contact cambering vehicle 200 that is similar in construction and operation to cambering vehicle 10. As described in connection with the first embodiment, the cambering vehicle 200 has a steering shaft 202 supporting a front wheel 204 and is manually steerable by a handle bar assembly such as shown in FIG. 1. The steering shaft is rotatably supported in a tubular front frame 206 that has a rearwardly and downwardly extending support strut 208 secured thereto that forms part of the front frame. A connector bar 210 further interconnects the strut 208 to the tubular frame 206. The lower end of strut 208 carries a transversely extending pivot shaft 212 which pivotally supports a pair of pulley assemblies 214 such as illustrated in FIGS. 1 - 4. These pulley assemblies pivotally support the laterally spaced left and right side trailing arms of which only the left side trailing arm 215 is shown, it being appreciated that the pulley assemblies and the trailing arms are substantially the same as those of the first embodiment. The left and right side pulley assemblies are drivingly interconnected to each other by an endless cable 216 looped around upper outer and inner pulleys 218 and 220 and in the manner described in the first embodiment. Pulleys 218 and 220 are rotatably supported in clevises 222 and 224 that are adjustably interconnected by a pair of support cables 226 and 228 which are looped over a transverse shoulder 230 secured to an upper portion of strut 208. Normally the pulleys 218 and 220 are retained in their full line position by the trap 234 which is fixed to the strut 208. As shown in FIGS. 5 and 6 the trap 234 has a recessed seat in which pulley 220 is mounted with the upper and lower linear surfaces of clevis 224 releasably engaging corresponding upper and lower retainer surfaces of the trap 234. With pulley 220 seated in fixed trap 234 the rake angle of the steering shaft is fixed. The pulley 220 is rotatably mounted in clevis 224 by pivot shaft 238 on which manual handle assembly 240 is threadedly connected. When it is desired to stow the vehicle the operator can conveniently grasp handle 240 and displace pulley 220 toward himself to remove the pulley 220 from the trap. The steering shaft 202 and frame 206 can then be folded between the trailing arms such as shown in FIG. 2 with the pulleys 218 and 220 being moved to their corresponding dotted line position. The trailing arms are preferably immobilized by turning the handle 240 in a clockwise direction so that clevis 224 clamps pulley 220 to prevent its rotation and accordingly rotation of the other pulleys in this system. With the vehicle in a rigid, low-profile package portability or stowage is enhanced. Obviously the handle 240 can be similarly employed to maintain the vehicle in an upright position for parking purposes.

If vehicle operation is desired the steering shaft and front frame are moved to an upright position and clevis 224 is reinserted into its seat in the trap 234.

While the invention has been described in connection with a preferred specific embodiment thereof, it will be appreciated that various modifications of this construction can be made in light of this description and without departing from the spirit of the disclosure or the scope of the following claims:

We claim:

1. A cambering vehicle having a steering frame operatively extending at an angle with respect to a support surface for the vehicle, a pair of elongated and laterally spaced trailing arms extending generally rearwardly from said steering frame, separate contact means operatively mounted on said steering frame and on each of said trailing arms for contacting the vehicle support surface, means operatively connecting the forward ends of the trailing arms to said steering frame comprising laterally extending pivot means supporting each of said arms for swinging movement in separate planes on opposite sides of said steering frame, stabilizer and equalizer means interconnecting said steering frame and said trailing arms to selectively maintain said steering frame at a predetermined rake angle with respect to said support surface and to provide for equal and opposite swinging movement of said trailing arms in response to cambering operation of said vehicle, said stabilizer and equalizer means comprising a pair of laterally spaced primary pulleys, means coupling a first of said pulleys to a forward portion of one of said arms and a second of said pulleys to a forward portion of another of said arms so that each respective arm rotates its associated pulley when said vehicle is cambered, an outer pulley rotatably supported on one side of a part of said steering frame, an inner pulley rotatably supported on the other side of said part of said steering frame, endless cable means drivingly interconnecting said pulleys so that swinging movement of one of said arms in one direction results in the equal swinging movement of the other of said trailing arms in a direction opposite to said one direction.

2. A cambering vehicle having a steering frame extending at an angle with respect to a support surface for the vehicle, a pair of elongated and laterally spaced trailing arms extending generally rearwardly from said steering frame, separate contact means operatively mounted on said steering frame and on each of said trailing arms for contacting the vehicle support surface, means operatively connecting the forward ends of the trailing arms to said steering frame comprising pivot means laterally extending with respect to the steering frame and supporting each of said arms for swinging movement in separate planes on opposite sides of said steering frame, stabilizer and equalizer means interconnecting said steering frame and said trailing arms to selectively maintain said steering frame at a predetermined rake angle with respect to said support surface or at a stowed position generally between said trailing arms and further to provide for equal and opposite swinging movement of said trailing arms in response to cambering operation of said vehicle, said stabilizer and equalizer means comprising a pair of laterally spaced primary pulleys, means coupling a first of said pulleys to a forward portion of one of said arms and a second of said pulleys to a forward portion of another of said arms so that each respective arm rotates its associated pulley when said vehicle is cambered, an outer secondary pulley rotatably supported on one side of said steering frame, an inner secondary pulley rotatably supported on the other side of said steering frame, endless cable means drivingly interconnecting said pulleys so that swinging movement of one of said arms in one direction results in the equal swinging movement of the other of said trailing arms in a direction opposite to said one direction, a cage fixed to said steering frame for supporting one of said secondary pulleys in a vehicle operating position and in a vehicle stow position spaced from said operating position, and means interconnecting said secondary pulleys whereby said one of said secondary pulleys can be moved between the vehicle stow and operating positions to selectively condition said vehicle for stowage or cambering operation, and means to prevent rotation of one of said pulleys to lock said stabilizer and equalizer means to thereby hold said trailing arms and said steering frame rigid in a vehicle operating or stowed position.

3. A cambering vehicle having an angularly extending steering frame, a pair of elongated and laterally spaced trailing arms extending generally rearwardly from said steering frame, separate contact means operatively mounted on said steering frame and on each of said trailing arms for contacting a support surface for said vehicle, means operatively connecting the forward ends of the trailing arms to said steering frame comprising pivot means supporting each of said arms for swinging movement in separate planes on opposite sides of said steering frame, stabilizer and equalizer means interconnecting said steering frame and said trailing arms to selectively maintain said steering frame at a predetermined rake angle with respect to said support surface and to provide for equal and opposite swinging movement of said trailing arms in response to cambering operation of said vehicle, said stabilizer and equalizer means comprising a pair of laterally spaced primary pulleys, means coupling a first of said pulleys to a forward portion of one of said arms and a second of said pulleys to a forward portion of another of said arms so that each of said respective arms rotates its associated pulley when said vehicle is cambered, an outer pulley rotatably supported on one side of said steering frame, an inner pulley rotatably supported on the other side of said steering frame, endless cable means extending from said inner pulley around one of said primary pulleys to said outer pulley and around said outer pulley around said other of said primary pulleys and back to said inner pulley so that swinging movement of one of said arms results in the equal and opposite swinging movement of the other of said trailing arms.

4. A cambering vehicle foldable between a collapsed position for stowage and an upright position for cambering operation comprising an angularly extending steering frame, a pair of elongated and laterally spaced trailing arms extending generally rearwardly from said steering frame, separate contact means operatively mounted on said steering frame and on each of said trailing arms for contacting a support surface for said vehicle, connector means operatively connecting the forward ends of the trailing arms to said steering frame, said connector means comprising pivot means supporting each of said arms for movement in planes intersecting the support surface on opposite sides of said steering frame, stabilizer and equalizer means interconnecting said steering frame and said trailing arms to selectively maintain said steering frame at a predetermined angle with respect to said support surface and to provide for equal and opposite swinging movement of said trailing arms in response to cambering operation of said vehicle, said stabilizer and equalizer means comprising a pair of laterally spaced primary pulleys, means coupling a first of said pulleys to a forward portion of one of said arms and a second of said pulleys to a forward portion of another of said arms so that each of said respective arms rotates its associated pulley in a corresponding direction with respect to a transverse axis when said vehicle is cambered, an outer secondary pulley rotatably supported on a longitudinal axis on one side of said steering frame, an inner secondary pulley rotatably supported on another longitudinal axis on the other side of said steering frame, endless cable means connected to said primary pulleys and extending from said inner pulley around one of said primary pulleys to said outer pulley and around said outer pulley around said other of said primary pulleys and back to said inner pulley so that swinging movement of one of said arms results in the equal and opposite swinging movement of the other of said trailing arms, connector means interconnecting said secondary pulleys whereby said secondary pulley may be displaced to permit the steering frame to be folded toward said collapsed position intermediate said trailing arms, locking means to lock one of said pulleys to hold said trailing arms and said steering frame in a fixed position with respect to each other and cage means to secure said secondary pulleys first positions for vehicle operation and second positions for vehicle parking and stowage.

5. A cambering vehicle having a front steering frame, a pair of elongated and laterally spaced trailing arms extending generally rearwardly from said steering frame, separate contact means operatively mounted on said steering frame and on each of said trailing arms for contacting a support surface, means operatively connecting the forward ends of the trailing arms to said steering frame comprising laterally extending pivot means supporting each of said arms for swinging movement in separate planes on opposite sides of said steering frame, stabilizer and equalizer means interconnecting said steering frame and said trailing arms to selectively maintain said steering frame at a predetermined rake angle with respect to said support surface and to provide for equal and opposite swinging movement of said trailing arms in response to cambering operation of said vehicle, said stabilizer and equalizer means comprising a pair of laterally spaced primary pulleys, means coupling a first of said pulleys to a forward portion of one of said arms and a second of said pulleys to a forward portion of another of said arms so that each respective arm rotates its associated pulley when said vehicle is cambered, second and third pulleys rotatably supported by said steering frame, endless cable means drivingly interconnecting all of said pulleys so that swinging movement of one of said arms in one direction results in the equal swinging movement of the other of said trailing arms in a direction opposite to said one direction.

* * * * *